J. NEBERLE.
HOLDER FOR SURFACE INDICATING GAGES.
APPLICATION FILED MAY 29, 1912.
1,059,948.
Patented Apr. 22, 1913.
2 SHEETS—SHEET 1.
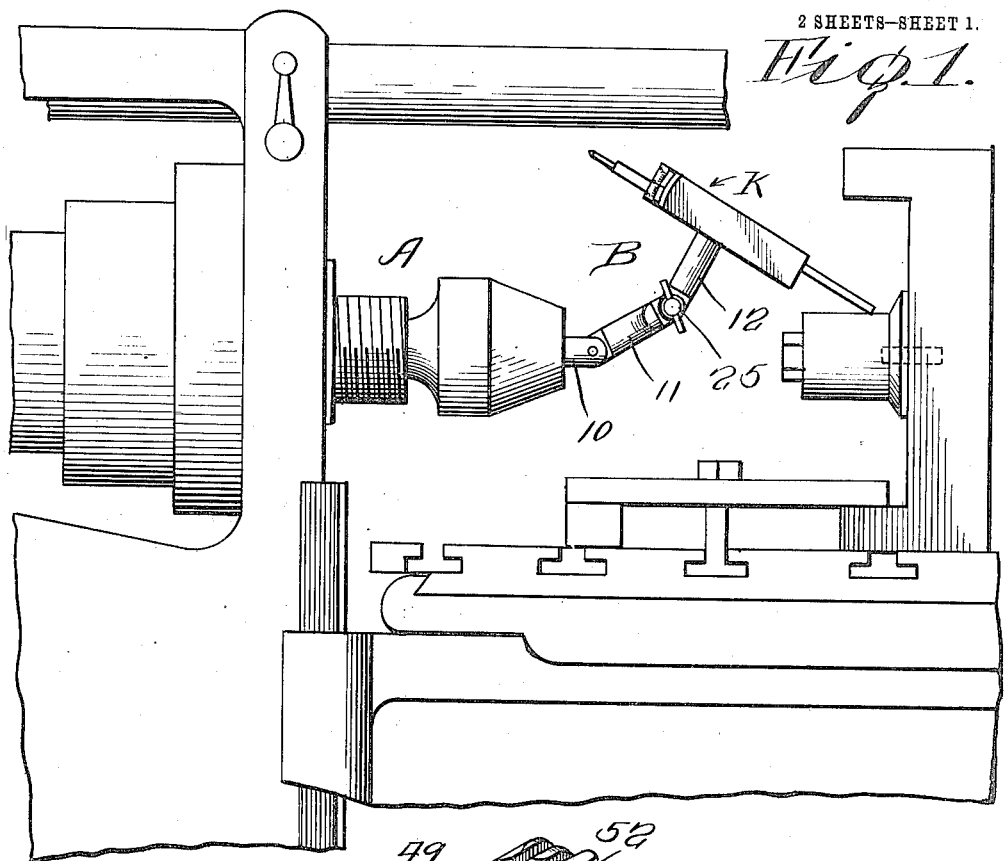
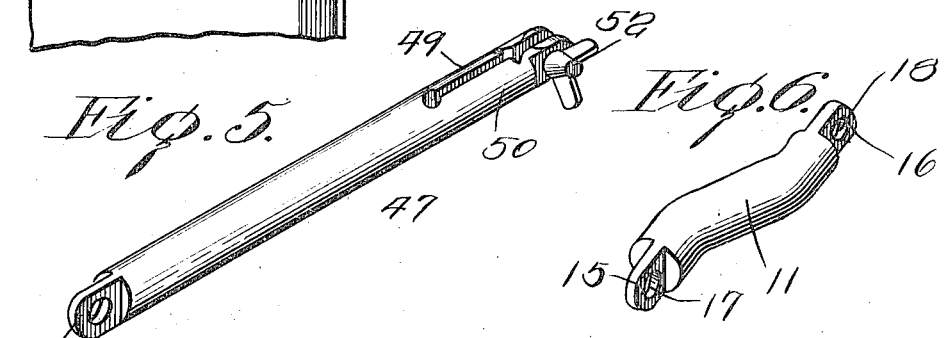
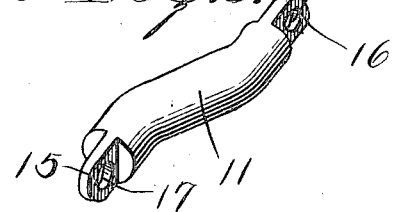
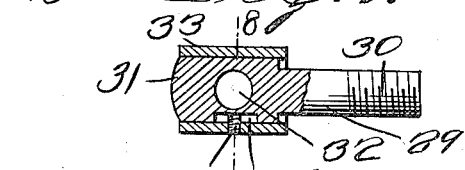
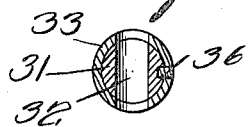
Inventor
J. Neberle.

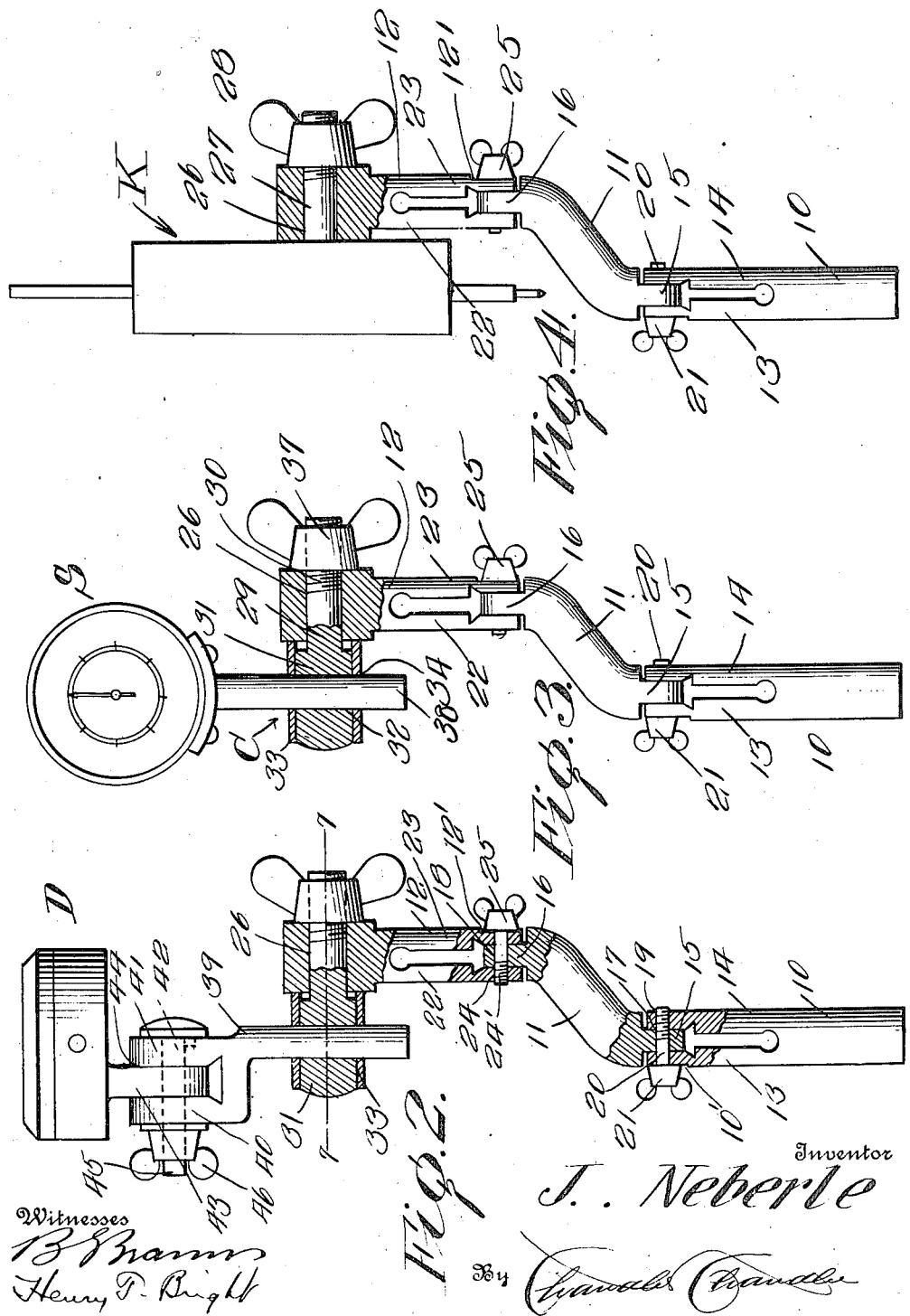

UNITED STATES PATENT OFFICE.

JULIUS NEBERLE, OF SAGINAW, MICHIGAN.

HOLDER FOR SURFACE-INDICATING GAGES.

1,059,948.

Specification of Letters Patent. Patented Apr. 22, 1913.

Application filed May 29, 1912. Serial No. 700,494.

*To all whom it may concern:*

Be it known that I, JULIUS NEBERLE, a citizen of the United States, residing at Saginaw, in the county of Saginaw, State of Michigan, have invented certain new and useful Improvements in Holders for Surface-Indicating Gages; and I do hereby declare the following to be a full, clear, and exact description of the invention, such as will enable others skilled in the art to which it appertains to make and use the same.

This invention relates to holders for surface indicating gages of the type used for indicating inequalities of size or surface.

The object of the invention resides in the provision of a holder which is adapted for use in operatively mounting various types of indicating gages employed to center work and indicate variations in plain surfaces.

With the above and other objects in view, the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a side elevation of a portion of a milling machine showing the holder supporting a "Koch" indicator, said indicator being utilized to properly locate the drill of the machine in conjunction with the usual button employed for such purposes, Fig. 2, a view partly in elevation, and partly in section of the holder, showing same having a "Brown and Sharp indicator" associated therewith, Fig. 3, a view similar to Fig. 2 showing the holder having a "Starret" indicator associated therewith, Fig. 4, a view similar to Fig. 2 showing the holder having a "Koch" indicator associated therewith, Fig. 5, a detail perspective view of a lengthening section to be employed in the holder when necessary, Fig. 6, a detail perspective view of the knee section of the holder, Fig. 7, an enlarged section on the line 7—7 of Fig. 2, Fig. 8, an enlarged section on the line 8—8 of Fig. 7.

Referring to the drawings A indicates the chuck of a milling machine in which the holder, indicated generally at B, is adapted to be secured.

The holder B is shown as comprising a plurality of sections 10, 11 and 12 which are pivotally connected to each other end to end. The section 10 is adapted to be secured within the chuck A after the fashion of an ordinary drill. The end of the section 10 which protrudes from the chuck A is forked so as to form arms 13 and 14. The section 11 which constitutes the knee section of the holder has its ends offset from each other and provided respectively with longitudinally directed ears 15 and 16. These ears 15 and 16 are provided with openings 17 and 18 respectively, the opening 17 of the ear 15 being adapted to register with openings 19 formed in the arms 13 and 14 of the section 10 when the ear 15 is inserted between said arms. When the opening 17 is disposed in registration with the openings 19 a screw 20 is passed through the openings 17 and 19 and then engaged by a thumb nut 21. In this manner the section 11 is pivotally connected to the section 10 and may be readily moved to different angular adjustments with respect to the section 10 and then locked in a desired adjustment by manipulating the thumb nut 21. The section 12 of the holder has its inner end forked so as to form arms 22 and 23 and these arms are provided respectively with alined openings 24. In securing the section 12 to the section 11 the ear 16 of the section 11 is positioned between the arms 22 and 23 with the opening 18 of the ear 16 disposed in registration with the openings 24 in the arms 22 and 23. A screw 24' is then passed through the registering openings 18 and 24 and a thumb nut 25 engaged with said screw. By this construction it will be apparent that the section 12 may be adjusted angularly with respect to the section 11 and locked in desired angular adjustments by manipulating the thumb nut 25 as will be apparent. It will be noted that the sections 10 and 12 are flattened as at 10' and 12' on their outer faces at the points where they are adapted to be engaged by the thumb nuts 21 and 25 respectively when the latter are in locking position. This flattening of the sections 10 and 12 is resorted to for the purpose of presenting a more extensive friction surface to the thumb nuts 21 and 25 and thereby increase the effectiveness of the locking action of the latter.

The outer end of the section 12 is enlarged and provided with a transverse opening 26. In securing a "Koch" indicator, designated at K to the holder the securing stud 27 of such indicator is inserted through the opening 26 and the usual thumb nut 28 then engaged with the threaded outer end of said stud. In securing a "Starret" indicator designated at S to the section 12 of the holder, there is employed a clamping device indicated generally at C. This device is shown as comprising a shank 29 having a threaded portion 30 at one end and an enlarged portion 31 at the other end provided with an opening 32 therethrough. Slidable on the enlarged portion 31 is a sleeve 33 provided with openings 34 adapted to register simultaneously with the opening 32 as said sleeve is moved longitudinally of the enlarged portion 31. This enlarged portion 31 is further provided with a groove 35 in its periphery in which is engaged a pin 36 fixed in the sleeve 33 and adapted to lock said sleeve against axial rotation on the enlarged portion 31 and also limit the longitudinal movement of said sleeve on said enlarged portion.

The shank 29 of the clamping device C is inserted in the opening 26 in the section 12 and a thumb nut 37 then engaged with the threaded portion 30 of said shank. The openings 34 of the sleeves 33 are then brought into registration with the opening 32 of the enlarged portion 31 and the securing stud 38 of the "Starret" indicator inserted through said registering openings. It will be noted that when the openings 34 of the sleeve 33 are in registration with the opening 32 of the enlarged portion 31 the inner end of said sleeve projects slightly beyond the inner end of the enlarged portion 31 so that when the thumb nut 37 is screwed on the end of shank 29 the sleeve 33 will be drawn into engagement with the section 12 before said section is engaged by the inner end of the enlarged portion 31. This engagement of the sleeve 33 with the section 12 will tend to force the sleeve outwardly on the enlarged portion and thus friction the walls of the openings 34 against the securing stud 38 so as to lock the indicator S to the holder. In securing a "Brown and Sharp" indicator to the holder the same clamping device C is utilized but instead of the securing stud of the indicating device being inserted through the openings 32 and 34 a separate arm 39 is inserted through said openings and the outer end of this arm terminates in a forked portion including arms 40 and 41 having alining openings 42 therein respectively. The "Brown and Sharp" indicator is designated at D and is shown provided with a securing ear 43 having an opening 44 therein. This ear 43 is inserted between the arms 40 and 41 so as to bring the opening 44 into registration with the openings 42. A screw 45 is then passed through the registering openings 44 and 42 and a thumb nut 46 engaged with the threaded end of the screw. By manipulating this thumb nut 46 it will be apparent that the indicator D will be clamped between the arms 40 and 41 and said indicator thereby secured to the holder.

It will be noted that by providing the knee section 11 with offset ends the various indicators, when assembled with the holder is disposed on the same side of section 12 as section 10.

In some instances it is necessary to lengthen the holder and to reach this end there is provided a lengthening section 47 one end of which is provided with an ear 48 adapted to be inserted and pivotally secured between the arms 13 and 14 of the section 10 by the screw 20 and thumb nut 21, while the other end of said lengthening section is forked to form arms 49 and 50 adapted to receive the ear 17 of the section 11 between them, said sections 11 and 47 being pivotally secured together by means of a screw 51 and thumb nut 52 as will be obvious. It will be understood that as many lengthening sections may be utilized in the holder as the particular circumstances demand.

What is claimed is:

1. A holder for indicating gages comprising a plurality of sections pivotally connected to each other end to end for independent swinging movement, means for locking said sections in different angular adjustments with respect to each other, one of the terminal sections being adapted for insertion in a chuck and the intermediate section having its ends offset from each other whereby the terminal sections will be disposed on opposite sides of the longitudinal center of the intermediate section and the longitudinal axes of said terminal sections disposed parallel, and means carried by the last named terminal sections for securing an indicator thereto with its longitudinal axis disposed in a common vertical plane with the longitudinal axis of the first named terminal member.

2. A holder for indicating gages comprising a plurality of sections pivotally connected to each other end to end for independent swinging movement, means for locking said sections in different angular adjustments with respect to each other, one of the terminal sections of said holder being adapted for insertion in a chuck, means carried by the other terminal sections for securing an indicator thereto in longitudinal alinement with the first named terminal section, said means comprising a shank inserted through a transverse opening in the last named terminal section and having one end threaded and its other end provided with an enlarged head having a transverse opening therethrough, a thumb nut engaged on the threaded end of the shank whereby the manipulation of same will draw the enlarged head toward the last named terminal section, a sleeve slidable on the enlarged head and provided with alined openings adapted to register with the opening in the head, the inner end of said sleeve being disposed beyond the inner end of the head when the openings of the sleeve and head are in registration, means for locking said sleeve against axial rotation on the head, and an indicator supporting arm inserted through the openings of the head and sleeve and adapted to be locked against disengagement therefrom by frictional contact with the walls of the openings in the sleeve when the latter is drawn against the last named terminal section by the manipulation of said thumb nut.

In testimony whereof, I affix my signature, in presence of two witnesses.

JULIUS NEBERLE.

Witnesses:
 KURT LORKE,
 JOHN JEFFERS.